Jan. 29, 1935.　　W. VOGEL ET AL　　1,989,346
MULTICORE POWER CABLE
Filed Sept. 8, 1932
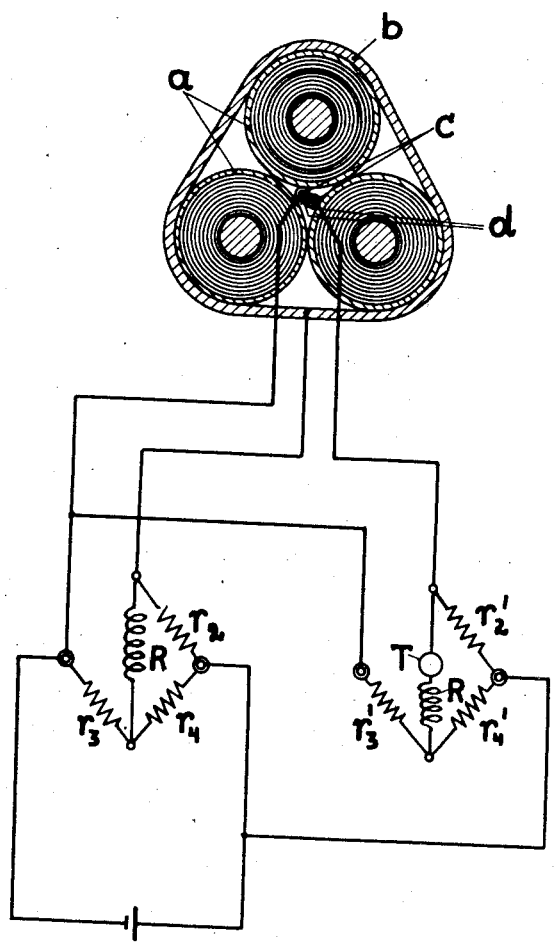
W. Vogel & R. Baurmann
INVENTORS
By: Marks & Clerk
Attys.

UNITED STATES PATENT OFFICE 1,989,346

MULTICORE POWER CABLE

Wilhelm Vogel and Karl Baurmann, Cologne-Mulheim, Germany, assignors to Felten & Guilleaume Carlswerk Actien-Gesellschaft, Cologne-Mulheim, Germany Application September 8, 1932, Serial No. 632,224
In Germany July 10, 1931

1 Claim. (Cl. 173—266)

In the operation of power cables, more particularly high tension cables, it is of great importance to be able to detect in the early stages external damages which sooner or later must cause leakages or short-circuits and to ascertain where the fault has occurred. In the present state of the art and the practical experiences with cables, it would appear to be the most suitable plan to mount the protective devices outside the cable insulation, as it has been found that almost all faults occurring in the cables and sleeves may be traced to external influences (mechanical damage or corrosion).

Cable arrangements are known in which conductors having an insulation which is sensitive to moisture are disposed in the insulation of the cores or in the gusset-shaped parts of the insulation. These arrangements, however, all have the disadvantage that the testing wire and the cable conductor insulation are housed in one and the same mechanically strong and closely-fitting sheath so that although any damage to this sheath will cause the testing wires to respond, it will also have the disadvantage of causing the cable insulation proper to deteriorate. The present invention is based on the fact that when such auxiliary conductors which are insulated with dry, unimpregnated highly hygroscopic paper are housed in multi-core cables, outside the conductor insulation and completely separated therefrom, the moisture penetrating through the damaged place of the outer common cable sheath into the dry paper insulation of these conductors can be utilized for determining the position of the fault without there being any danger of the conductor insulation being detrimentally affected. For this purpose, in multi-core cables in which three insulated cable cores surrounded with an impervious metal sheath are enclosed by a common outer impervious metal sheath without filling the gusset-shaped spaces, conducting wires having a dry, unimpregnated paper insulation are disposed in one or more of the said gusset-shaped spaces and are connected outside the cable (at the cable ends or at the junction sleeves) to a relay system which indicates faults in the insulation of the telephone conductors and at the same time enables the cable temperature to be ascertained by checking the resistance. At the ends of the cable, the cable cores and the protective wires must be led out of the outer sheath in such a manner that neither air nor moisture can penetrate into the gusset-shaped spaces of the cable. For this purpose, a closing cap is placed on the ends of the external cable sheath, which, at the places where the separate cable cores provided with an impervious sheath and the protective wires are led out, firmly embraces both the sheaths of the separate cores and also the protective wires and thereby provides a moisture-tight closure. The cable cores and auxiliary wires which are led out of the outer cable sheath in this manner terminate in separate end closures. These auxiliary wires may be placed in the cable by introducing one or more ordinary telephone conductors when laying the cores of the multi-core cable.

When the cable is in operation and undamaged, the normal cable temperature is ascertained by a resistance test. Should the cable, however, be damaged from the outside, the moisture penetrating through the faulty place of the outer sheath will in a short time be absorbed by the dry paper insulation of the signal wires and their insulation value reduced. This deterioration of the insulation value is then utilized for putting a warning signalling device into operation, whereupon the position of the damage can be ascertained in a known manner by the loop method of fault localization. As the impregnated cable insulation reacts very slowly to moisture, the signal system which is connected to the telephone cores will, even in the case of serious damage (for instance in the case of submerged cables), always respond sooner than a cable fault can develop in the main installation. The arrangement made use of in the method described above has the further advantage that with it it is always possible to determine the mean temperature of a cable at any time so that steps may be taken as regards the maximum admissible current load. This provides the possibility, for instance in the winter, when the soil is very cold, of loading the cable more heavily than in the summer without exceeding the admissible maximum temperature, which is of special value in view of the fact that the current consumption is usually higher in the winter.

The accompanying drawing shows the cable arrangement used. $a$ are the impervious sheaths over the core insulation, $b$ the outside covering of the whole cable (lead sheath) and $c$ the protective conductors (telephone cores) which are insulated with dry unimpregnated paper $d$. In the measuring device for ascertaining the cable fault or the cable temperature, which is illustrated in the drawing and is connected to the protective conductors $e$ and the outer lead sheath $b$, $r_2$, $r_3$, $r_4$ and $r_2'$, $r_3'$, $r_4'$ are bridge resistances, R relays and T a temperature indicating instrument (zero instrument).

What we claim is:—

A power cable comprising a plurality of cores arranged to provide a central gusset-shaped open space therebetween, an impervious metallic sheath around each core, an impervious external metallic sheath enclosing said cores, a plurality of testing conductors for keeping the cable under observation and grouped in said space between the cores, and dry unimpregnated paper of relatively high moisture absorptive quality covering said conductors and directly exposed to moisture penetrating said external sheath.

WILH. VOGEL.
KARL BAURMANN.